(12) United States Patent
Miu et al.

(10) Patent No.: US 8,983,283 B2
(45) Date of Patent: Mar. 17, 2015

(54) METHOD AND APPARATUS FOR OPERATING AN ELECTRIC WATER HEATER USING ADJUSTABLE TEMPERATURE SETPOINTS

(75) Inventors: Richard Miu, Lexington, OH (US); Lawrence J. Brazis, Orrville, OH (US); Richard E. Welch, Lexington, OH (US)

(73) Assignee: Emerson Electric Co., St. Louis, MO (US)

( * ) Notice: Subject to any disclaimer, the term of this patent is extended or adjusted under 35 U.S.C. 154(b) by 2288 days.

(21) Appl. No.: 11/342,375

(22) Filed: Jan. 27, 2006

(65) Prior Publication Data
US 2007/0175883 A1  Aug. 2, 2007

(51) Int. Cl.
H05B 3/78 (2006.01)
H05B 3/80 (2006.01)
F24H 9/20 (2006.01)

(52) U.S. Cl.
CPC .............. *F24H 9/2021* (2013.01); *Y02B 30/108* (2013.01)
USPC ........... 392/498; 392/463; 392/500; 219/483; 219/486; 219/492; 219/494; 219/497; 236/1 C; 236/40; 236/41; 236/42; 236/43

(58) Field of Classification Search
USPC ........... 307/39–41; 236/1 C, 40–43; 219/492, 219/494, 497, 486, 483; 392/463
See application file for complete search history.

(56) References Cited

U.S. PATENT DOCUMENTS

| | | | | |
|---|---|---|---|---|
| 3,240,426 A | * | 3/1966 | Newbury et al. ............. | 235/94 R |
| 3,478,817 A | * | 11/1969 | Shaw .............................. | 165/228 |
| 4,333,002 A | * | 6/1982 | Kozak ........................... | 392/451 |
| 4,920,252 A | * | 4/1990 | Yoshino ........................ | 219/497 |
| 5,626,287 A | * | 5/1997 | Krause et al. ................ | 236/20 R |
| 5,683,605 A | * | 11/1997 | Matsuoka ..................... | 219/497 |
| 5,706,191 A | * | 1/1998 | Bassett et al. ..................... | 700/9 |
| 5,736,059 A | | 4/1998 | Mackelvie | |
| 6,109,533 A | * | 8/2000 | Ao et al. ........................ | 237/2 B |
| 6,246,831 B1 | * | 6/2001 | Seitz et al. ..................... | 392/486 |
| 6,293,471 B1 | * | 9/2001 | Stettin et al. ................ | 236/20 R |
| 6,350,967 B1 | * | 2/2002 | Scott ............................ | 219/497 |
| 6,374,046 B1 | | 4/2002 | Bradenbaugh | |
| 6,493,643 B1 | * | 12/2002 | Aisa ............................... | 702/60 |
| 6,633,726 B2 | * | 10/2003 | Bradenbaugh ............... | 392/463 |
| 6,772,052 B1 | * | 8/2004 | Amundsen et al. ........... | 700/291 |
| 6,981,385 B2 | * | 1/2006 | Arshansky et al. ............ | 62/155 |
| 7,032,543 B1 | * | 4/2006 | Akkala et al. ............... | 122/14.31 |
| 2003/0091091 A1 | | 5/2003 | Patterson et al. | |
| 2004/0090195 A1 | * | 5/2004 | Motsenbocker .............. | 318/109 |
| 2004/0194825 A1 | * | 10/2004 | Kempf et al. ................. | 137/337 |
| 2004/0206405 A1 | * | 10/2004 | Smith et al. ............... | 137/624.12 |
| 2005/0006488 A1 | * | 1/2005 | Stanimirovic ............... | 236/49.1 |
| 2005/0075738 A1 | * | 4/2005 | Attarwala ........................ | 700/44 |
| 2007/0175883 A1 | * | 8/2007 | Miu et al. ..................... | 219/400 |
| 2009/0195349 A1 | * | 8/2009 | Frader-Thompson et al. | 340/3.1 |

* cited by examiner

*Primary Examiner* — Brett Spurlock
(74) *Attorney, Agent, or Firm* — Harness, Dickey & Pierce, P.L.C.

(57) ABSTRACT

A control system for an electric water heater having an upper heating element and a lower heating element is disclosed. The control system includes a control module that controls operation of the electric water heater by selectively toggling the upper and lower heating elements between an ON state and an OFF state and a consumer interface module that allows a consumer to input a set point temperature and select an energy savings mode for the electric water heater. The control module regularly monitors hot water usage and adjusts the set point temperature by a predetermined setback amount until a capacity of the water heater matches consumer usage.

15 Claims, 8 Drawing Sheets

METHOD AND APPARATUS FOR OPERATING AN ELECTRIC WATER HEATER USING ADJUSTABLE TEMPERATURE SETPOINTS

FIELD OF THE INVENTION

The present invention relates to electric water heaters and more particularly to a control system for controlling the capacity of an electric water heater for energy efficiency.

BACKGROUND OF THE INVENTION

Electric water heaters are conventionally used in residential and commercial buildings to supply the occupants of the building with a reservoir of hot water. The water heater typically includes a tank that is fluidly coupled to a water supply of the building at an inlet and is fluidly coupled to building fixtures such as faucets, showers, and dishwashers at an outlet. The water heater tank receives cold water from the building water supply at the inlet and heats the water to a set point temperature using lower and upper heating elements. The lower and upper heating elements raise the temperature of the water disposed within the water heater tank to the set point temperature by converting current from a building power supply into radiant heat. The heated water is stored within the tank and is held at the set point temperature by the heating elements so that a supply of hot water is constantly and consistently provided at a desired temperature.

Conventional electric water heaters typically include a control system that monitors a temperature of water disposed within the water tank to ensure that the water contained therein is maintained at a predetermined set point temperature. The set point temperature is typically a consumer-selected setting that allows the consumer to determine a temperature of the hot water to be produced by the water heater. The control system continuously monitors the temperature of the water within the tank via a temperature sensor and compares the sensed temperature to the set point temperature. The control system generally includes an upper temperature sensor associated with the upper heating element and a lower temperature sensor associated with the lower heating element. The upper temperature sensor and lower temperature sensor each provide information regarding the water temperature near the respective elements. The respective sensors, in combination with the upper and lower heating elements, allow the control system to selectively heat the water disposed within the tank when the sensed temperature falls below the set point temperature.

In operation, the upper heating element of a conventional electric water heater is energized by the control system to heat a volume of water generally between the upper heating element and a top of the tank (i.e., an upper zone of the tank). Once the water in the upper zone of the tank is at the set point temperature, the control system de-energizes the upper heating element and energizes the lower heating element. The lower heating element heats a volume of water generally above the lower heating element and below the upper heating element (i.e., a lower zone of the tank). The lower heating element remains energized until the water within the lower zone of the tank is at the set point temperature.

Water, when heated, rises due to the physical properties (i.e., density) of heated water relative to the cooler water within the tank. Therefore, as the lower heating element heats water, the heated water rises within the tank and cold water descends toward the lower heating element. The descending cold water mixes with the passing hot water and is heated by the lower heating element. This process continues until the entire volume of water disposed within the lower zone of the tank reaches the set point temperature.

When a consumer draws hot water from the tank, the initial hot water drawn from the tank outlet is disposed within the top zone of the tank, near the upper heating element and upper temperature sensor. When the hot water exits the tank, a fresh supply of cold water is introduced into the tank at an inlet. The inlet is generally disposed at a bottom of the tank, below the lower heating element. The incoming cold water eventually contacts the lower heating element as the hot water is displaced (i.e., drawn from the tank at the outlet). At this point, the lower temperature sensor detects the influx of cold water and relays the information to the control system. The control system processes the information from the lower temperature sensor and energizes the lower heating element to heat the incoming cold water until the set point temperature is achieved.

If the consumer does not use all of the hot water available in the tank, the lower heating element remains energized and continues to heat the water (as described above) until the set point temperature is reached. However, there are instances when the consumer draws a sufficient volume of hot water from the tank such that the volume of cold water entering the tank reaches the upper heating element. Such an occurrence is known as a "deep draw" event. A deep draw event is identified when the upper temperature sensor detects a significant drop in temperature due to the incoming cold water. Upon detection of the incoming cold water, the control system de-energizes the lower heating element and energizes the upper heating element in an effort to quickly heat the smaller volume of cold water above the upper element to the set point temperature before the water exits the tank.

When the consumer stops using hot water, the influx of cold water is similarly stopped. At this point, the upper heating element continues to heat water disposed in the upper zone of the tank until the upper temperature sensor detects that the water disposed in the upper zone is at the set point temperature. The control system then de-energizes the upper heating element and energizes the lower heating element to heat the water disposed within the lower zone of the tank. The lower heating element remains energized until the lower temperature sensor detects that the temperature of the water disposed within the lower zone is at the set point temperature. In this manner, conventional hot water heaters include a control system that responds to a draw of hot water from the tank by continually heating the entire volume of water disposed within the tank to the set point temperature.

The capacity of an electric water heater is conventionally understood as the volume of water that the water heater is able to heat and maintain at a set point temperature. For example, an eighty-gallon water heater can heat and store eighty gallons of water. In this regard, then, the capacity of the eighty-gallon water heater is eighty gallons.

The effective capacity of the water heater that is realized by a consumer, however, is greater than the simple volume capacity of the water heater that was just described. This is so because a consumer does not typically use water at the set point temperature when a call for "hot water" at a household fixture is made. While the set point temperature for a water heater can vary, it is not uncommon that the set point is at 120° F. or higher. A consumer demand for "hot water" at a fixture, however, generally is for water at a comfortable temperature that is well below the set point temperature. Consequently, in order to produce the "hot water" that is used by the consumer, water drawn from the water heater is mixed with cold water from the building water supply. Thus, for example, for every gallon of "hot water" that is used by the consumer, only a half-gallon of water is drawn from the water heater. This effectively increases the amount of "hot water" that the electric water heater can provide to a consumer.

As a general proposition, the higher the set point temperature of the water heater, the lower the volume of water that needs to be drawn from the water heater in order to produce "hot water" for the consumer. Similarly, the lower the set point temperature of the water heater, the higher the volume of water that needs to be drawn from the water heater in order to produce "hot water" for the consumer. Thus, the effective capacity of the water heater can be adjusted by raising or lowering the set point temperature of the water heater. For example, a lower set point temperature would require more water from the water heater to produce the desired "hot water." Thus, hot water from the water heater is used faster and the effective capacity of the system is reduced. Conversely, raising the set point temperature would require less water from the water heater to provide the same "hot water." Increasing the set point temperature, therefore, increases the capacity of the water heater.

A conventional control system for an electric water heater generally operates to maintain the entire volume of water in the tank at the set point temperature, as described above. These control systems operate independent of the actual demands for hot water made by the consumer. Therefore, even if the consumer's requirements for "hot water" were regularly smaller than the effective capacity of the water heater, the water heater would nonetheless repeatedly heat all of the water to the set point temperature all of the time.

Therefore, it is desirable to provide a control system that can continuously monitor and adjust the effective capacity of an electric water heater based on consumer demands in order to save energy associated with operation of the electric water heater. Furthermore, it is also desirable to provide a control system that enables the electric water heater to satisfy government energy standards, while simultaneously providing a consumer with an adequate "hot water" capacity.

SUMMARY OF THE INVENTION

Accordingly, a method and apparatus for operating an electric water heater is provided. The invention comprises a control system including a control module and a consumer interface module. The control module controls operation of the electric water heater by selectively energizing and/or de-energizing one or more heating elements. The consumer interface module enables a user to input a set point temperature for the electric water heater and select an energy savings mode. The control module continuously monitors and adjusts the user-selected set point temperature until a capacity of the water heater matches consumer usage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

With reference to the figures, an electric water heater 10 is provided and includes a control module 12. The control module 12 adjusts an effective capacity of the electric water heater 10 by continuously monitoring and adjusting a set point temperature of the water heater 10 until an optimum effective capacity of the electric water heater 10 is achieved. As used herein, the term module refers to an application specific integrated circuit (ASIC), an electronic circuit, a processor (shared, dedicated, or group), and memory that execute one or more software or firmware programs, a combinational logic circuit, and/or other suitable components that provide the described functionality.

The set point temperature is a consumer-selected input and is generally defined as the maximum temperature that the consumer selects for the heated water that exits the water heater 10. The effective capacity of the water heater 10 is generally defined as the ability of the water heater 10 to provide a volume of water at a "delivered temperature." The delivered temperature is the temperature of the water as used by the consumer at a fixture. The delivered temperature of the water is generally lower than the set point temperature because the delivered temperature is usually achieved by mixing water from the water heater 10 at the set point temperature with cold water from the building water supply.

The effective capacity of the water heater 10 is directly related to the set point temperature as follows: the higher the set point temperature, the lower the volume of hot water that is necessary to be mixed with the cold water to produce the water at the fixture at the delivered temperature. Conversely, the lower the set point temperature, the higher the volume of hot water that is necessary to be mixed with the cold water to produce the water at the fixture at the delivered temperature. Therefore, there is a direct correlation between the set point temperature and the effective capacity of the water heater 10.

The control module 12 monitors and controls the effective capacity of the water heater 10 by selectively adjusting the consumer-selected set point temperature. In so doing, the control module varies the effective capacity of the water heater 10 to meet the specific needs of the consumer. By adjusting the effective capacity of the water heater 10 to meet the demand of the consumer, the control module 12 is able to minimize energy consumption of the water heater 10 while maintaining the ability to produce a satisfactory volume of hot water for the consumer.

Figure 1:
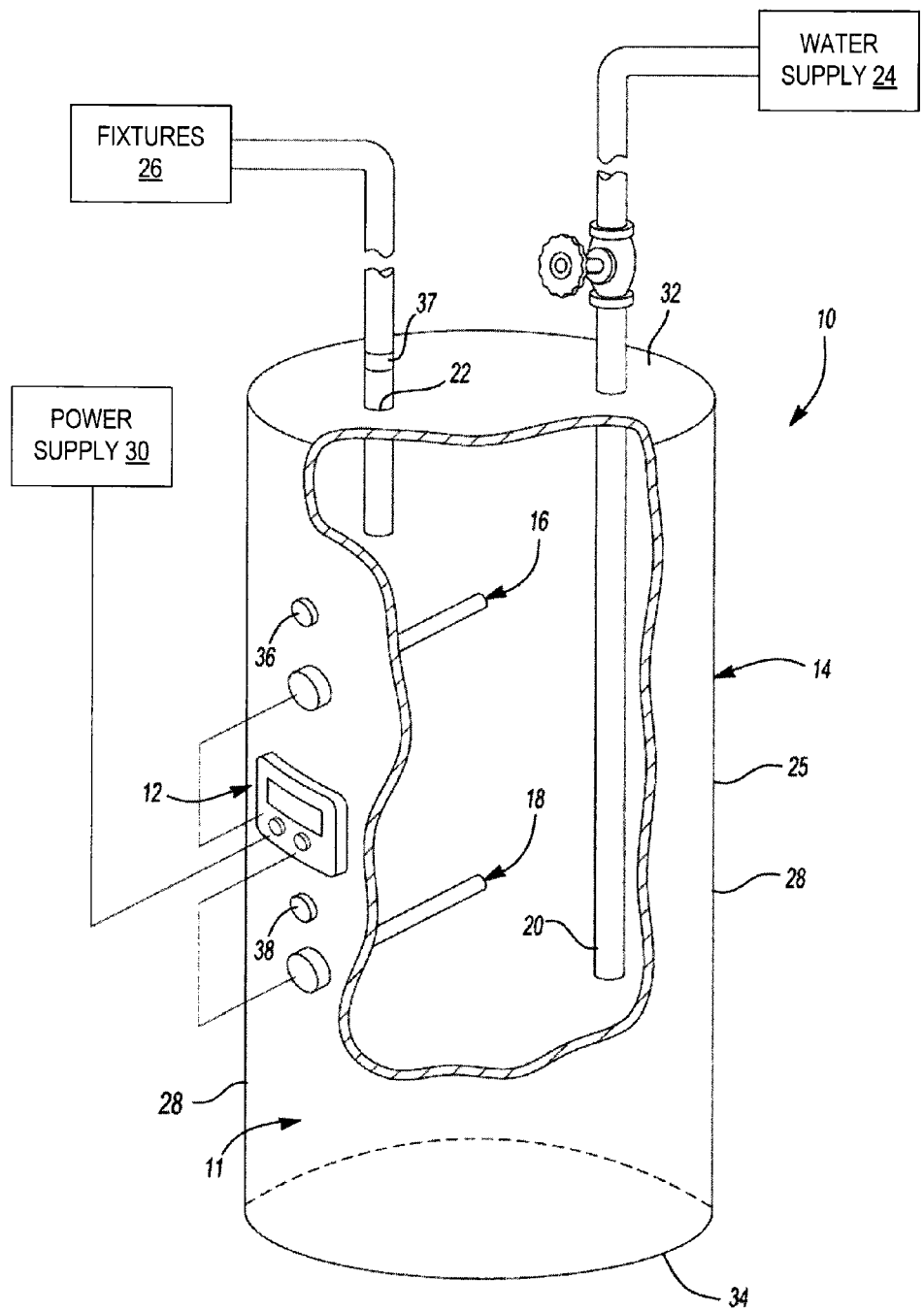
FIG. 1 is a schematic representation of an electric water heater that is operated in accordance with the principles of the present invention.

With reference to FIG. 1, the electric water heater 10 is shown to include a tank 14, an upper heating element 16, and a lower heating element 18. The tank 14 defines an interior 11 having a volume and includes an inlet 20 and an outlet 22, both fluidly coupled to the interior 11. The inlet 20 is also fluidly coupled to a water supply 24, while the outlet 22 is also fluidly connected to the hot water pipes leading to the building fixtures, such as faucets, showers, dishwashers, and clothes washers, etc., which are schematically represented at 26. The inlet 20 receives a constant supply of cold water under pressure from the building water supply 24 such that the interior 11 of the tank 14 is always full of water. Hot water only exits the tank 14 through the outlet 22 when a demand for hot water is made at one of the fixtures 26 throughout the building. Cold water, therefore, only enters the tank 14 when hot water exits the tank 14 through the outlet 22.

The upper heating element 16 and the lower heating element 18 each extend through a side wall 25 of the tank 14 and generally into the interior 11. The upper heating element 16 is disposed near an upper wall 32 of the tank 14. The lower heating element 16 is disposed near a lower wall 34 of the tank 14. The lower heating element 18 is generally closer to the lower wall 34 of the tank 14 than the upper heating element 16 is to the upper wall 32.

The upper and lower heating elements 16, 18 receive current from a power supply 30 via the control module 12. The control module 12 regulates each of the upper and lower heating elements 16, 18 between an ON state and an OFF state.

The electric water heater 10 also includes a sensor module 35 (see, FIG. 8) in communication with the control module 12. The sensor module 35 comprises an upper temperature sensor 36 and a lower temperature sensor 38, each in communication with the control module 12. Outputs from the upper and lower temperature sensors 36, 38 which correspond to their respective temperature readings are monitored by the control module 12.

The upper temperature sensor 36 is disposed adjacent to the upper heating element 16 to monitor a temperature of water within the tank 14 in an upper zone (i.e., generally between the upper heating element 16 and the upper wall 32). The lower temperature sensor 38 is disposed adjacent to the lower heating element 18 to monitor a temperature of water within the tank 14 in a middle zone (i.e., generally between the lower heating element 18 and the upper heating element 16). The temperature sensors 36, 38 are preferably thermistors, such as NTC thermistors, but could be any suitable temperature sensor that can accurately and reliably provide an output which is indicative of the temperature of the water residing within the tank 14 near the sensor.

In addition to the foregoing, the sensor module 35 could also comprise two or more upper temperature sensors 36 disposed near the upper heating element 16. Such an arrangement would provide redundant temperature readings at the upper heating element 16. In a device having such an arrangement, the control module 12 would monitor the output from the plurality of sensors 36 and the sensor output indicative of the highest measured temperature would be used to control the operation of the upper heating element 16. In addition, the control module 12 can compare the respective outputs from the sensors 36 for a self-diagnostic procedure. For example, if the difference between the output of any two sensors 36 is above a predetermined threshold value, the control module 12 could detect a sensor fault and require that the water heater 10 be shut down for maintenance or repair.

Further, the sensor module 35 could also include a flow sensor 37 disposed at the inlet 20 or the outlet 22 of the tank 14. The flow sensor 37 could monitor a flow of water entering or exiting the tank 14. Therefore, output from the flow sensor 37 could be used by the control module 12 to control the operation of the upper and lower heating elements 16, 18. The flow sensor 37 could also be used to determine the volume of water that has been drawn from the water heater 10 over a period of time.

Figure 2:
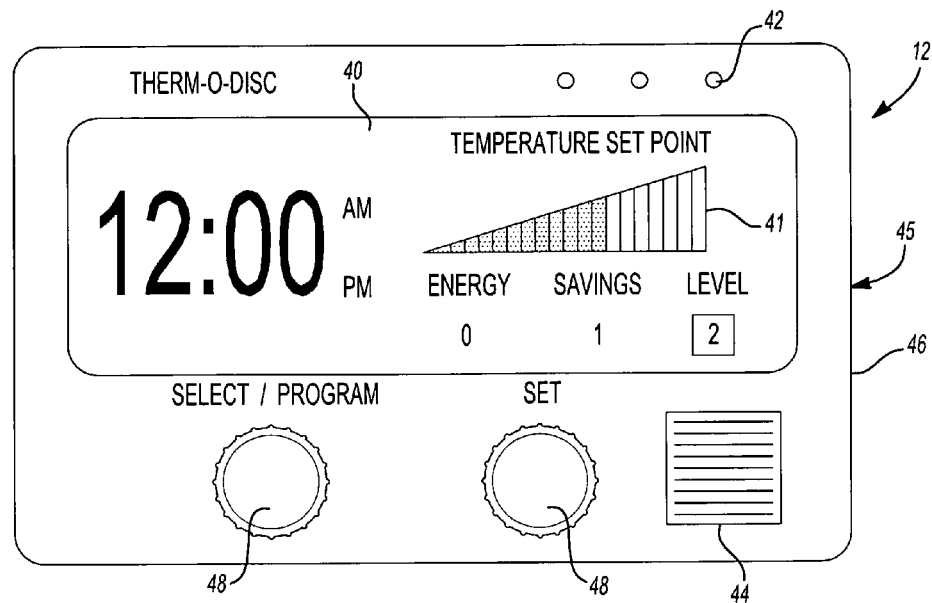
FIG. 2 is a schematic representation of a consumer interface module of the electric water heater of FIG. 1.

Referring now to FIG. 2, the control module 12 includes a consumer interface module 45 having a liquid crystal display (LCD) 40, a series of light-emitting devices (LEDs) 42, and a speaker 44, all contained within a control module housing 46. The LCD 40 displays the operating parameters of the electric water heater 10 such as the set point temperature (see bar graph 41 of FIG. 2), an energy savings level (e.g., 0, 1 or 2), and other useful information such as the date and time. In addition, the LCD 40 may be backlit to allow use of the control module 12 in a dark or dimly-lit basement. The LEDs 42 are positioned adjacent to the LCD 40, but may also be incorporated into the LCD 40 to visually indicate operating parameters of the electric water heater 10. The speaker 44 allows the control module 12 to audibly alert a consumer of a particular condition of the water heater 10. In addition to the foregoing, the control module 12 also includes at least user-input device 48 (e.g., a button) to enable the consumer to communicate with the consumer interface 45.

Figure 3A:
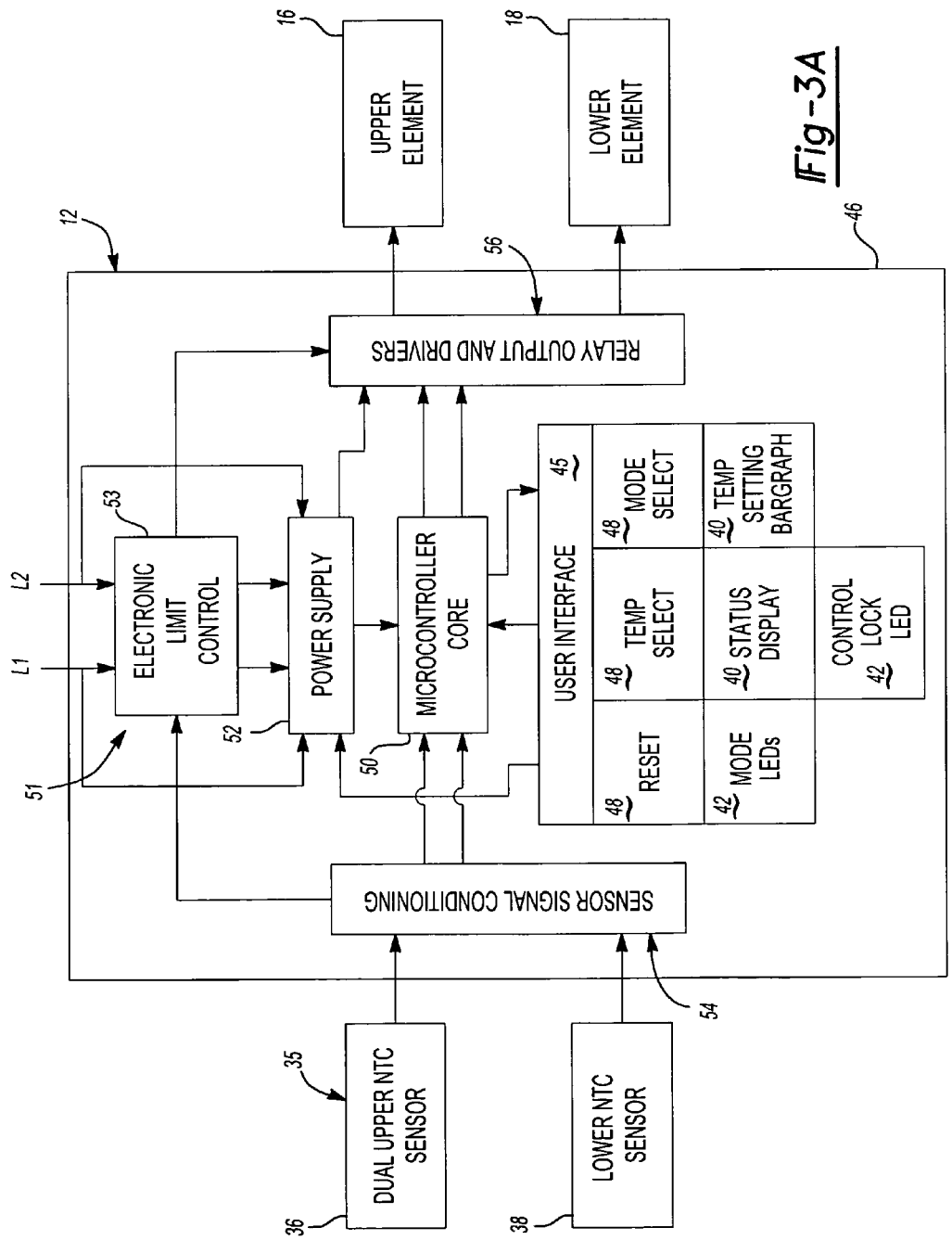
FIG. 3A is a schematic representation of a control module incorporating an electronic upper limit sensor for an electric water heater in accordance with the principles of the present invention.

Turning to FIG. 3A, the control module 12 also comprises a microcontroller 50 in communication with the sensor module 35 and the consumer interface module 45. The microcontroller 50 is powered by a power supply 52 disposed generally within the control module housing 46. The power supply 52 receives power from line voltages L1, L2.

Figure 3B:
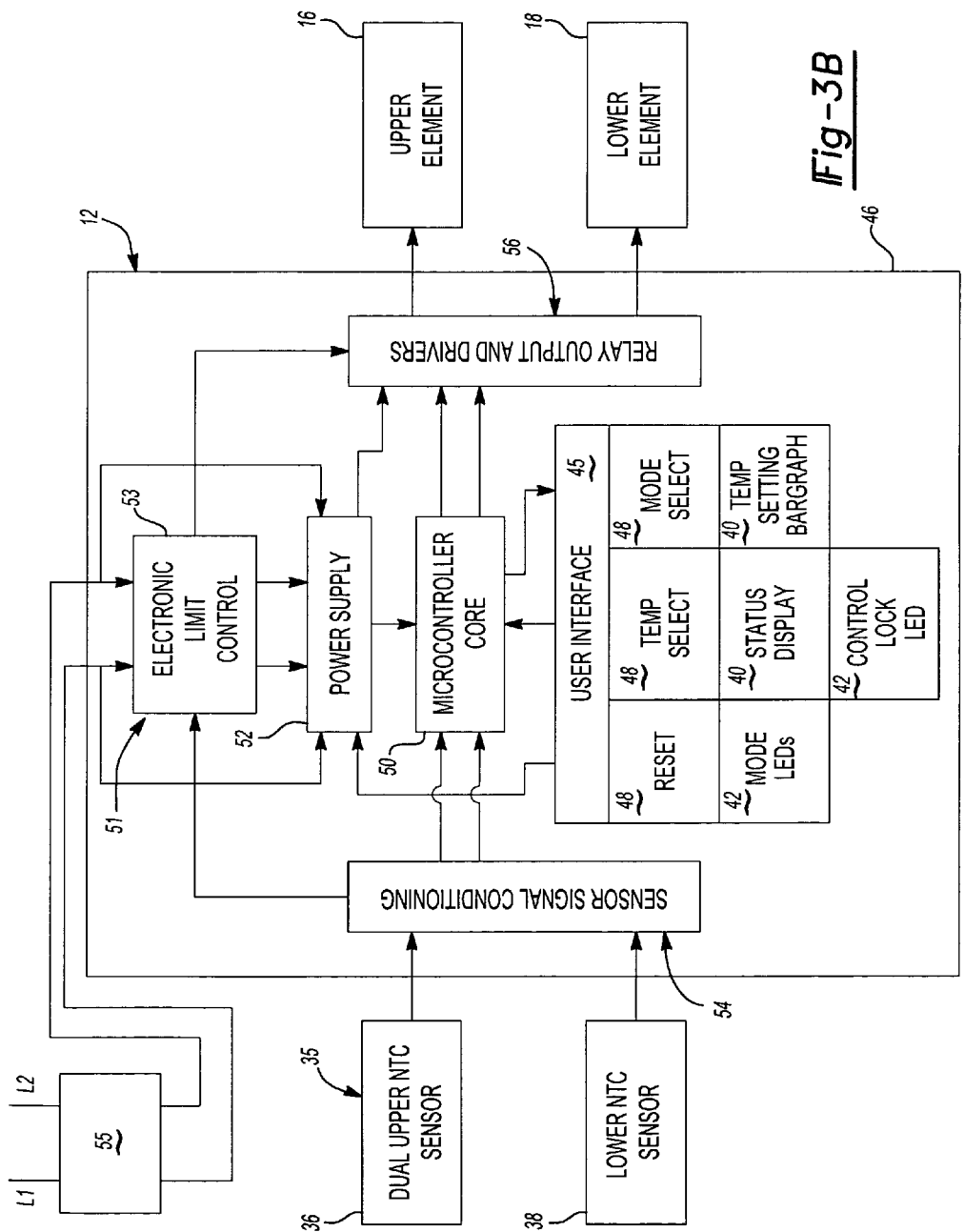
FIG. 3B is a schematic representation of a control module incorporating a bimetal upper limit switch and electronic upper limit sensor for an electric water heat in accordance with the principles of the present invention.

A limit control module 51 controls power to the heating elements 16, 18 based on readings from the upper and lower temperature sensors 36, 38. The limit control module 51 of FIG. 3A is shown as an electronic limit control module 53 and essentially acts as a backup device to the microcontroller 50. For example, if the microcontroller 50 fails to cut power to the upper and lower heating elements 16, 18, the electronic limit control module 53 shuts down the heating elements 16, 18 based on readings from the upper and lower temperature sensors 36, 38. The limit control module 51 could also include a bimetal snap disc thermostat 55, as shown in FIG. 3B. The bimetal snap disc thermostat 55 receives line voltages L1, L2 and selectively prevents power from reaching the upper and lower heating elements 16, 18.

In either of the foregoing configurations, the limit control module 51 is a separate circuit from the microcontroller 50 and selectively cuts power to the upper and lower heating elements 16, 18 based on readings from the upper and lower temperature sensors 36, 38. The limit control module 51 only cuts power to the upper and lower heating elements 16, 18 when the microcontroller 50 fails to do so based on readings from the upper and lower temperature sensors 36, 38.

The microcontroller 50 is also in communication with a sensor conditioning module 54 and a relay and driver module 56. The sensor conditioning module 54 receives the output from the respective temperature sensors 36, 38 and directs the output to the microcontroller 50 and electronic limit control module 51. The relay and driver module 56 receives event messages from the microcontroller 50 based on input from the upper and lower temperature sensors 36, 38 to toggle the upper and lower heating elements 16, 18 between the ON state and the OFF state by selectively allowing line voltage L1, L2 to supply current to the respective heating elements 16, 18.

Operation of the electric water heater 10 and associated control module 12 is best understood with reference to FIGS. 4-7. Generally speaking, the control module 12 monitors the consumer's hot water usage over time and provides an effective capacity for only the amount of hot water that is actually needed. The control module 12 can reduce the effective capacity by reducing a consumer-selected selected set point temperature by a setback value and recommend a reduction in the consumer-selected set point temperature if further reductions to the set point temperature are not possible. The control module 12 can increase the effective capacity by recommending an increase in set point temperature. In this manner, the control module 12 is able to tailor the effective capacity of the water heater 10 to the actual hot water consumption of the consumer.

When the water heater 10 is initially installed, the tank 14 is completely filled with cold water from the building water supply 24 via the inlet 20. At this point, all of the water within the tank 14 is substantially at the same temperature (i.e., cold). The consumer selects a set point temperature setting at the consumer interface 45 by depressing one of the buttons 48. The set point temperature represents the temperature of the water that the control module 12 seeks to achieve in the tank 14 within a tolerance. The tolerance recognizes that the actual water temperature within the tank may be different from the measured temperature provided by sensors 36, 38. The set point temperature can be set, for example, to one of twenty temperature settings. The twenty settings are exemplified by the bar graph of FIG. 2, though more or fewer temperature settings could be used. The respective temperature settings provide the control module 12 adjusts the effective capacity of the water heater 10.

In addition to selecting the desired set point temperature, the consumer is also able to select a desired energy savings setting, for example 0—No Energy Savings, 1— Moderate Energy Savings, or 2— Aggressive Energy Savings. Selecting an energy level provides the control module 12 with the ability to adjust the consumer set point temperature to tailor effective capacity. The energy savings levels are exemplified by levels 0, 1, 2 (FIG. 2) but could include additional energy savings levels. The consumer selects the respective energy savings setting at the consumer interface 45 by depressing one of the buttons 48.

The first energy savings setting, 0—No Energy Savings, does not allow the control module 12 to lower the consumer-selected set point temperature. The second energy savings level, 1—Moderate, allows the control module 12 to lower the consumer-selected set point temperature by an initial setback value. Thus, the temperature to which the water in the water heater 10 will be heated is the control set point temperature, i.e., the consumer-selected set point temperature minus the initial setback value. As already described, a lower water temperature in the tank 14 reduces the effective capacity of the electric water heater 10. At the reduced set point temperature, the consumer draws more hot water from the tank 14 in order to obtain water at a desired temperature. Energy savings, though, is realized because the entire volume of water in the tank 14 is heated to a lower temperature.

The third energy savings setting, 2—Aggressive, similarly allows the consumer-selected set point temperature to be lowered by the initial setback value. In addition, the second energy savings setting allows the control module 12 to lower the set point temperature still further, by up to a maximum setback value. With the maximum setback value, the control module 12 can further reduce the effective capacity of the water heater 10 in an effort to optimize the energy efficiency of the water heater 10 based on consumer demand for hot water.

Once the consumer selects a set point temperature and energy savings setting, the control module 12 initially controls the water heater 10 based on the respective consumer inputs (i.e., set point temperature and energy savings setting).

In operation, the control module 12 first determines the control set point temperature based on the initial setback value. Note that regardless of which energy savings level is selected (i.e., 1 or 2), the control module 12 initially sets the control set point temperature to a value equal to the consumer-selected set point temperature minus the initial setback value, unless the energy savings level chosen is 0—No Energy Savings. In so doing, the control module 12 generates a control set point temperature that is lower than the consumer-selected set point temperature, reducing the effective capacity of the water heater 10. With the control set point temperature determined, the control module 12 then controls the function and operation of the electric water heater 10 as previously described.

Once the water heater 10 is at the control set point temperature the control module 12 monitors hot water consumption by the consumer. By monitoring the upper heating element 16, the control module 12 is able to react to hot water usage and adjust effective capacity. As previously discussed, the upper heating element 16 is only energized during a deep draw event when the incoming cold water contacts the upper temperature sensor 36. Therefore, the control module 12 is able to determine that the water heater 10 has excess effective capacity when the upper heating element 16 has not been energized for a predetermined period. In addition, the control module 12 is able to determine that there is a need for additional effective capacity if the upper heating element 16 has been energized for a predetermined period.

It should be noted that the predetermined amount of time is generally referred to as a "cycle" and is usually at least one week in duration to allow for a week's worth of household events that may give rise to a deep draw event such as, for example, laundry day. The control module 12 may also collect usage data to generate historical usage data (i.e., water usage over time). The control module 12 may then utilize the collected historical data to develop usage patterns. The usage patterns may be used by the control module 12 in anticipating setback temperatures for different times of day or days of the week. In this manner, the control module 12 may control the capacity of the water heater 10 based on historical information to prepare for certain household events.

For example, if laundry day falls on Thursday for three consecutive weeks, the control module 12 may increase the effective capacity of the water heater 10 on Wednesday night in anticipation of laundry day. Conversely, if a consumer is routinely away from home on Saturdays and Sundays, the water heater 12 may reduce the effective capacity on Friday night. Therefore, the control module 12 may be used to tailor energy consumption based on consumer water usage and may collect data to anticipate future water usage.

If the control module 12 determines that there is excess effective capacity in the water heater 10, the control module 12 will take one of two actions. First, if the energy savings setting is set to level 1, the control module 12 must continue to control the water heater at the consumer-selected set point temperature minus the initial setback value. If conditions warrant a further decrease in effective capacity, however, the control module 12 alerts the consumer via consumer interface module 45 to change the energy savings setting from level 1 to level 2. Second, if the energy savings setting is set to level 2, the control module 12 lowers set point temperature by the maximum set back value to further reduce the effective capacity of the water heater 10. However, the control module 12 is only permitted to reduce the set point temperature by the maximum setback value.

Conversely, if the control module 12 determines that there is not enough effective capacity in the water heater 10, the control module 12 increases the effective capacity by raising the control set point temperature, but is limited in doing so by the consumer-selected set point temperature.

Figure 4:
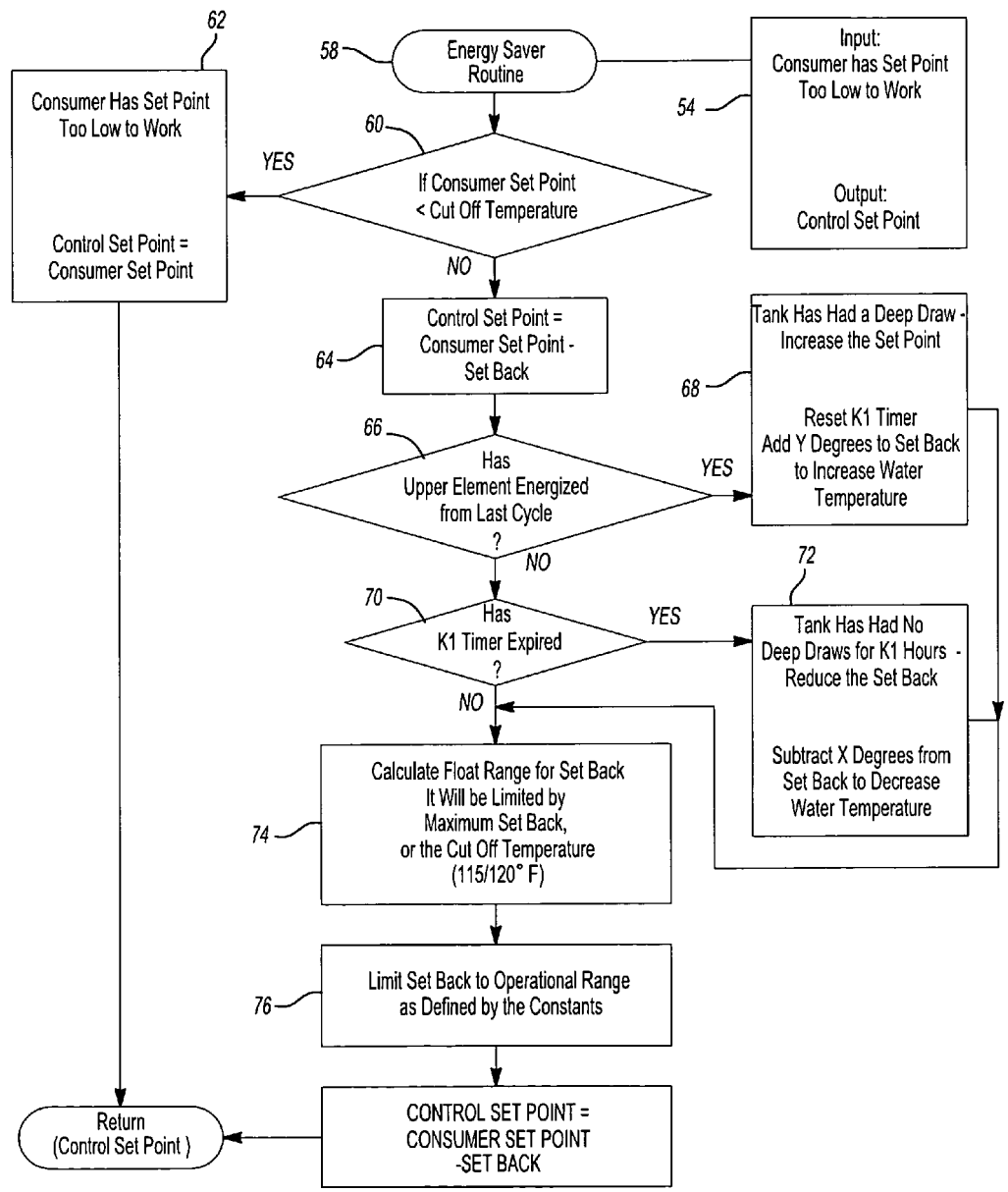
FIG. 4 is a flowchart that describes the operation of an energy saver module for an electric water heater in accordance with the principles of the present invention.

FIG. 4 details an exemplary savings module 58 for use by the control module 12 for determining when an increase or a decrease in effective capacity is warranted. The energy savings module 58 utilizes the control module 12 and associated sensor module 35 to tailor the effective capacity of the water heater 10 to the specific needs of the individual consumer by continuously monitoring the consumer's hot water usage. Initially, the control module 12 compares the consumer-selected set point temperature to a threshold cutoff temperature, which is too low to allow operation of the energy savings module 58 (i.e., a setback from the consumer-selected set point temperature would result in a cold water condition). In one exemplary embodiment, the cutoff temperature is between 115 degrees Fahrenheit and 120 degrees Fahrenheit. Therefore when the consumer-selected set point temperature is lower than the cutoff temperature (i.e., 115-120 degrees Fahrenheit), the energy savings module 58 sets the control set point temperature at the consumer-selected set point temperature at 62 as the control module 12 cannot setback the temperature lower than 115 degrees Fahrenheit. At this point, the control module 12 maintains the water disposed within the tank 14 at the consumer-selected set point temperature by selectively toggling the upper and lower heating elements 16, 18 between the ON and OFF states.

If the consumer-selected set point temperature is above the cutoff temperature, the control module 12 reduces the consumer-selected set point temperature by the initial setback amount to the control set point temperature at 64. Once the control set point temperature is determined, the control module 12 maintains the water within the tank 14 at the control set point temperature by selectively toggling the upper and lower heating elements 16, 18 between the ON and OFF states.

The control module 12 controls the water heater 10 at the control set point temperature for one cycle (i.e., at least one week). The control module 12 monitors the sensor module 35 to determine if the upper heating element 16 has been energized during the cycle at 66. If the upper heating element 16 has been energized during the cycle, the control module 12 concludes that the water heater 10 has experienced a deep draw event and requires additional effective capacity at 68. However, if the upper element 16 has not been energized during the cycle, the control module 12 references a timer to determine whether the cycle has expired at 70. If the timer has expired (indicating that the cycle has ended), the control module 12 concludes that the water heater 10 has not experienced a deep draw event within the last cycle at 72. At this point, the control module 12 concludes that the set point temperature should be further reduced to decrease the effective capacity of the water heater 10.

The control module 12 determines a float range for the setback value based on whether the upper heating element 16 has been energized during the last cycle at 74. The float range defines an amount the control module 12 is allowed to either increase or decrease the set point temperature to effectuate a change in effective capacity. The control module 12 is limited in implementing the float range by the maximum setback value as the control module 12 is not permitted to reduce the consumer-selected set point temperature more than the maximum setback value at 76. In addition, the control module 12 is limited by the cutoff temperature (i.e., 115-120 degrees Fahrenheit).

If the control module 12 determines that additional energy savings are possible because the upper heating element 16 has not cycled for a predetermined time, or that the water heater 10 is not producing enough hot water to keep up with demand (i.e., the upper heating element 16 is regularly cycled ON), the control module 12 alerts the consumer. The control module 12 notifies the consumer that at least one of the set point temperature setting or the energy savings level should be adjusted to allow the control module 12 the flexibility to optimize performance of the water heater 10. The control module 12 recommends such action through use of a performance monitoring module 78 to rectify an over capacity or an under capacity situation.

Figure 5:
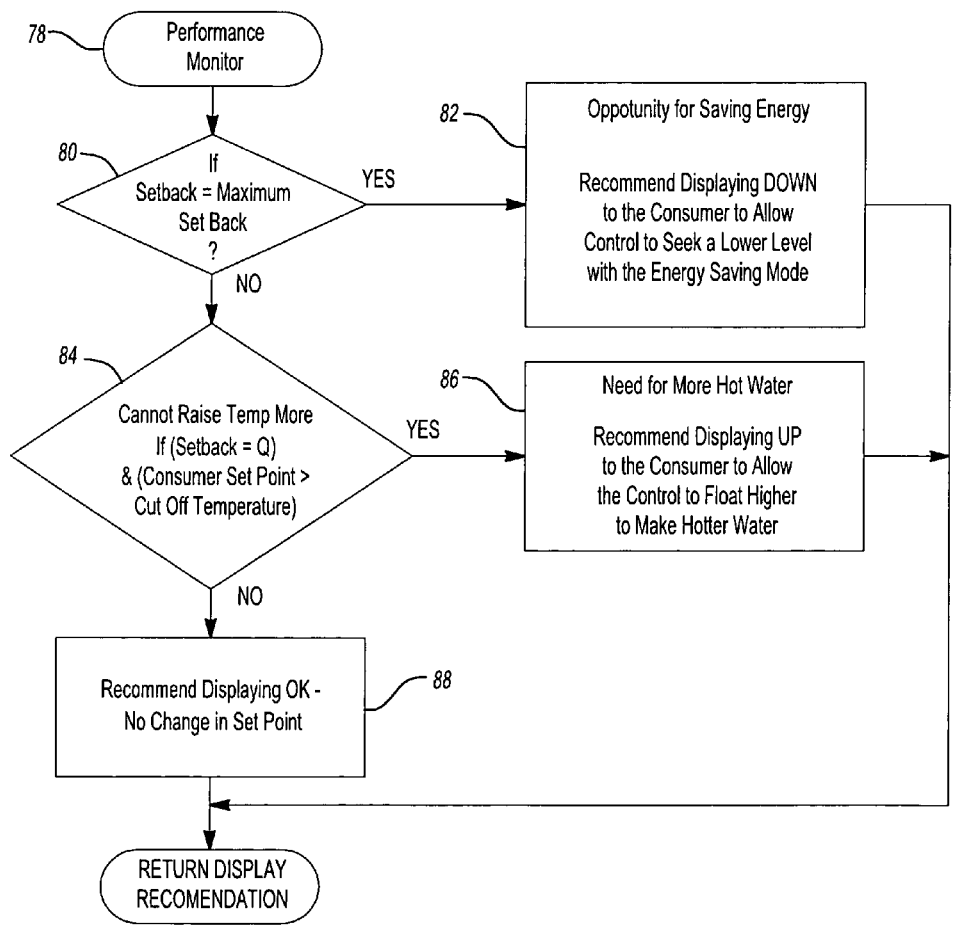
FIG. 5 is a flowchart that describes the operation of an electric water heater in accordance with the principles of the present invention.

With particular reference to FIG. 5, operation of the performance monitoring module 78 is described. The performance monitoring module 78 generates a recommendation to the consumer to save energy by selecting a lower set point temperature or generates a recommendation to the consumer to increase the set point temperature based on hot water demand history. For example, if the setback value is equal to the maximum setback value, the control module 12 cannot further reduce the consumer-selected set point temperature even if there is excess effective capacity in the water heater 10. Therefore, the only way for the control module 12 to reduce the effective capacity of the water heater 10 is to start at a lower consumer-selected set point temperature. Therefore, the control module 12 must alert the consumer that the consumer-selected set point temperature should be adjusted.

The control module 12 first determines if the setback value equals the maximum setback value at 80. If the setback value equals the maximum setback value, and the upper heating element 16 has not cycled ON for a predetermined period of time, the control module 12 recommends to the consumer via the LCD 40, LED 42, and/or speaker 44 that the consumer-selected set point temperature should be reduced to realize further energy savings at 82. If the consumer reduces the set point temperature, the control module 12 is able to further reduce the effective capacity of the water heater 10 by calculating the control set point temperature from a lower consumer-selected set point temperature. Such a reduction in effective capacity ultimately saves the consumer energy as excess water is not needlessly heated. In this manner, even though the control module is restricted from reducing the consumer-selected set point temperature by the maximum setback value, the control module 12 can still further reduce the effective capacity of the water heater 10.

If the setback amount is zero, and the upper heating element 16 has been cycled ON during a previous period, the control module 12 determines that an increase in effective capacity is necessary at 84. At this point, the control module 12 alerts the consumer of the need for additional effective capacity at 86 and recommends increasing the consumer-selected set point temperature via the LCD 40, LED 42, and/or speaker 44. If the control module 12 is able to properly control the effective capacity of the water heater 10 based on hot water demand and consumer-selected input, the control module 12 displays that the system is functioning within its limits and is able to sufficiently optimize the effective capacity of the water heater 10 at 88.

In each of the foregoing situations, the control module 12 must alert the consumer to either raise or lower the consumer-selected set point if the maximum setback is achieved. The control module 12 makes such recommendations through a consumer interface display module 90.

Figure 6:
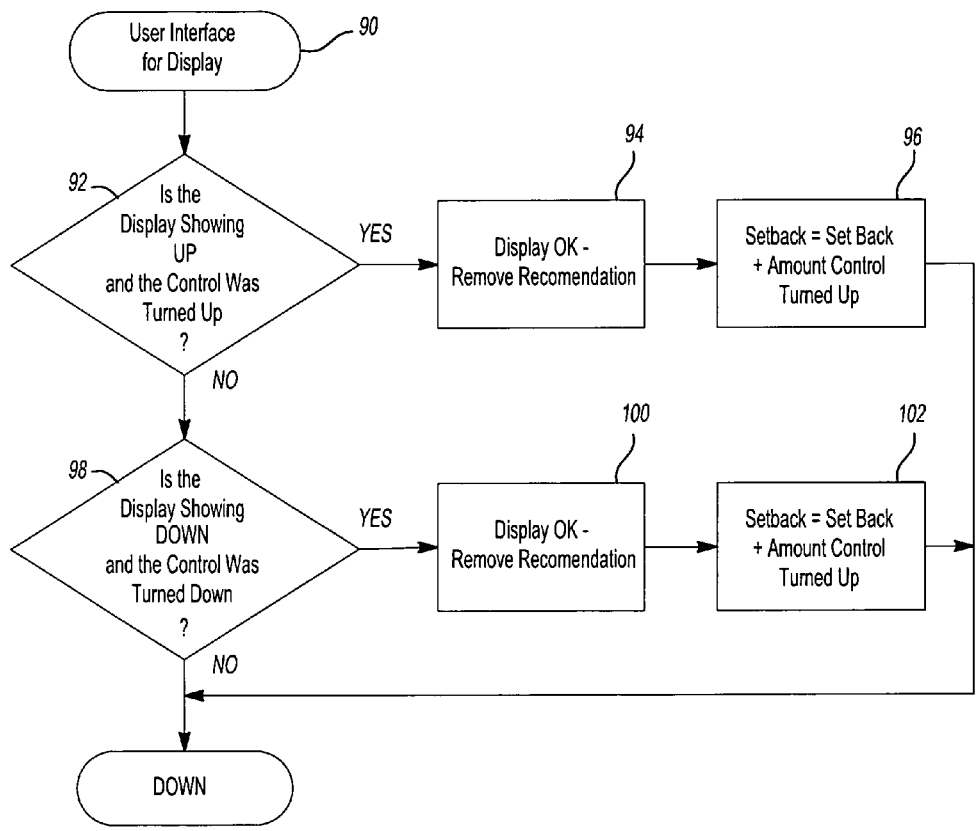
FIG. 6 is a flowchart that illustrates operation of a consumer interface module for an electric water heater controller in accordance with the principles of the present invention.

The consumer interface display module 90 for use with the above-described performance monitoring module 78 is shown in FIG. 6. The consumer interface display module 90 determines whether the LCD 40 recommends an increase in the consumer-selected set point temperature and whether the consumer has acted on the recommendation 92. If the consumer has acted on the recommendation, the recommendation is removed and the display 40 notes that the system is functioning within limits. At this point, the control module 12 sets the setback value to be generally equal to the initial setback value plus the amount that the consumer-selected set point temperature was increased 96.

Similarly, the consumer interface display module 90 determines whether the LCD 40 recommends a decrease in the consumer-selected set point temperature and whether the consumer has acted on the recommendation 98. If the consumer has acted on the recommendation, the recommendation is removed and the display 40 that the system is functioning within limits and is able to sufficiently optimize the effective capacity of the water heater 10 at 100. At this point, the control module 12 sets the setback value to be generally equal to the initial setback value minus the amount that the consumer-selected set point temperature was decreased 102.

It should be noted that for the consumer interface display module 90, the consumer's acting on the recommendation (i.e., to raise or lower the set point temperature range) does not immediately change the temperature of the water disposed within the tank 14. Following the recommendation simply shifts the control module's 12 operational limits so that the control module 12 has greater flexibility to further adjust the effective capacity of the water heater 10 when necessary in view of hot water demand history, thereby realizing greater energy efficiency.

Figure 7:
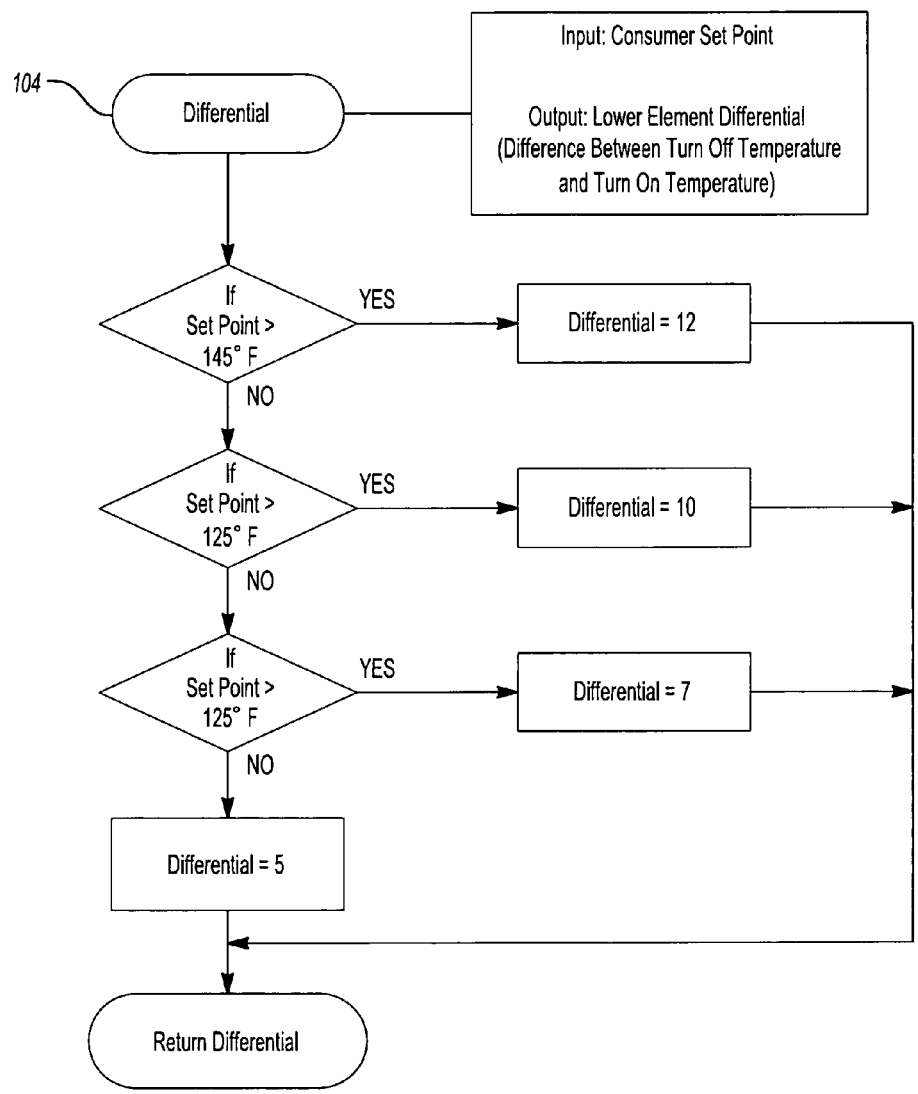
FIG. 7 is a flowchart that describes the operation of a water temperature differential module in accordance with the principles of the invention.

The control module 12, by optimizing effective capacity of the water heater 10, allows more hot water to be available at lower set point temperatures, as demonstrated by the differential module 104 of FIG. 7.

During periods of non-use, the temperature of water within the tank 14 will fall due to heat escaping through tank walls. Therefore, maintaining the tank 14 at a lower temperature reduces energy loss. At lower set point temperatures, the water within the tank 14 is only allowed to vary from the set point temperature a small amount to increase the average temperature of the tank 14. Reducing the operating range of the tank 14 at lower set point temperatures ensures that there is enough hot water within the tank 14 to deliver water at a comfortable temperature (i.e., the delivered temperature).

For higher set point temperatures, the differential module 104 allows a wider temperature differential (i.e., 12° F.) between the set point temperature and the temperature of the water at which the heating elements 16, 18 are energized. For lower temperatures, the differential module 104 allows a narrower temperature differential (i.e., 7° F.). This relationship allows more hot water to be available at lower set point temperatures. For example, a set point temperature of 145° F. requires a differential of 12° F., thereby allowing the water to range between 133° F. and 157° F. A set point temperature of 105° F. requires a differential of 7° F., thereby allowing the water to range between 98° F. and 112° F.

Each degree lost by the water heater 10 during non-use has a greater impact in reducing effective capacity at lower set point temperatures than at higher set point temperatures. Maintaining the temperature of the water close to the set point temperature allows more hot water to be available.

Therefore, by controlling the effective capacity of the water heater 10 to a state that minimizes the set point temperature (i.e., by reducing the consumer-selected set point temperature by the setback value), more hot water is available at lower set point temperatures and energy is saved.

Figure 8:
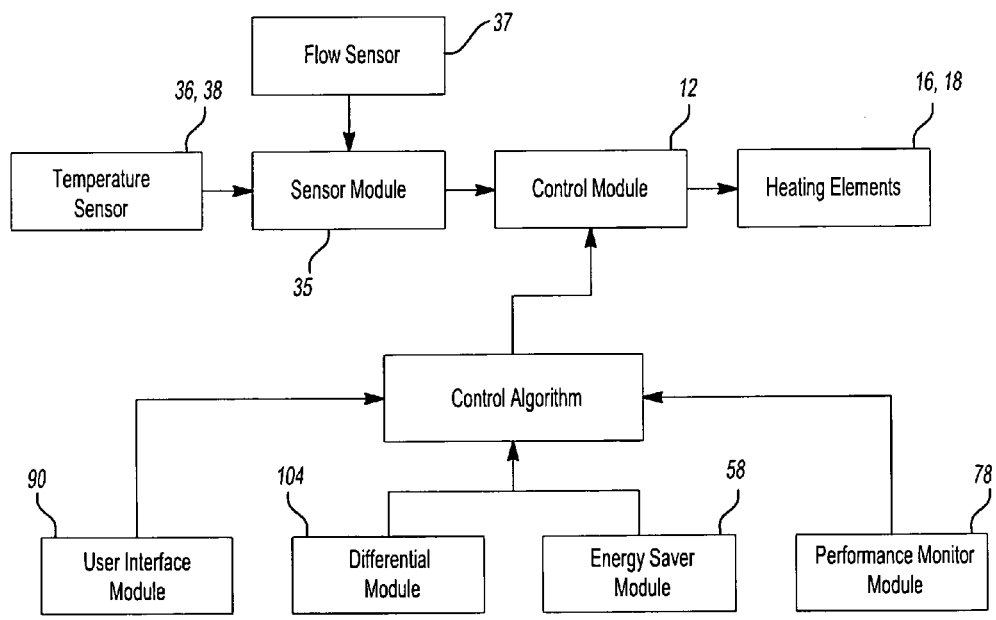
FIG. 8 is a schematic representation of a control system for a hot water heater according to the invention and incorporating a sensor module, a control algorithm, and a control module.

FIG. 8 schematically represents the relationship between the control module 12, sensor module 35, energy savings module 58, performance monitoring module 78, user interface module 90, and differential module 104. Each of the modules 35, 58, 78, 90, 104 communicate with the control module 12 to aid the control module 12 in continuously adjusting the set point temperature of the water heater 10 until the effective capacity and energy use are optimized.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control system for an electric water heater having an upper heating element and a lower heating element, the control system comprising:

a consumer interface module that allows a consumer to select i) a set point temperature for the electric water heater and ii) an energy savings level; and a control module that controls operation of the electric water heater by selectively toggling the upper and lower heating elements between an ON state and an OFF state, wherein the control module:

receives, as inputs, the consumer selected set point temperature and the energy savings level;

uses the energy savings level to determine a setback value;

uses the setback value and the consumer selected set point temperature to calculate a control set point temperature that differs from the consumer selected set point temperature by an amount up to the setback value;

controls the operation of the electric water heater according to the control set point temperature;

monitors hot water consumption by the consumer to generate historical usage data based on the hot water consumption;

generates and outputs an adjustment to the control set point temperature to control an effective capacity of the water heater, wherein the control module generates the adjustment using the consumer selected set point temperature, the setback value, and the historical usage data;

uses the historical usage data to determine whether the water heater (i) has excess effective capacity or (ii) needs additional effective capacity;

in response to determining whether the water heater has excess effective capacity or needs additional effective capacity, uses the consumer selected set point temperature and the setback value to determine whether increasing or decreasing the effective capacity requires an additional adjustment to the control set point temperature that exceeds the setback value; and generates, as an output in response to a determination that increasing or decreasing the effective capacity requires an additional adjustment to the control set point temperature that exceeds the setback value, a recommendation for the consumer to adjust the set point temperature.

2. The control system of claim 1, wherein the consumer interface module includes at least one of a display that visually communicates the recommendation to the consumer and a speaker that audibly communicates the recommendation to the consumer.

3. The control system of claim 2, wherein the visual display includes at least one of a light-emitting device and a liquid crystal display.

4. The control system of claim 1, further comprising a sensor module that receives an output from at least one sensor for input into the control module.

5. The control system of claim 1, further comprising at least one sensor in communication with the control module.

6. The control system of claim 5, wherein the at least one sensor is a temperature sensor.

7. The control system of claim 5, wherein the at least one sensor is a flow sensor.

8. The control system of claim 1, wherein using the historical usage data to determine whether the water heater (i) has excess effective capacity or (ii) needs additional effective capacity includes determining a frequency that the upper heating element is toggled into the ON state.

9. The control system of claim 1, wherein the control module is configured to operate according to a plurality of energy savings levels including the selected energy savings levels, and wherein the plurality of energy savings levels includes a first energy savings level that prevents the control module from adjusting the set point temperature and a second energy savings level that allows the control module to adjust the set point temperature by the setback value.

10. The control system of claim 9, wherein the plurality of energy savings levels includes a third energy savings level that allows the control module to adjust the set point temperature by the setback value and by a maximum setback value.

11. A method for operating an electric water heater having an upper heating element and a lower heating element, the method comprising:
  selecting i) a set point temperature for the electric water heater and ii) an energy savings level;
  controlling operation of the electric water heater by selectively toggling the upper and lower heating elements between an ON state and an OFF state, wherein controlling the operation includes:
    receiving, as inputs, the selected set point temperature and the energy savings level;
    using the energy savings level to determine a setback value;
    using the setback value and the selected set point temperature to calculate a control set point temperature that differs from the selected set point temperature by an amount up to the setback value;
    controlling the operation of the electric water heater according to the control set point temperature;
    monitoring hot water consumption by a consumer to generate historical usage data based on the hot water consumption;
    generating and outputting an adjustment to the control set point temperature to control an effective capacity of the water heater, wherein the adjustment is generated using the selected set point temperature, the setback value, and the historical usage data;
    using the historical usage data to determine whether the water heater (i) has excess effective capacity or (ii) needs additional effective capacity;
    in response to determining whether the water heater has excess effective capacity or needs additional effective capacity, using the selected set point temperature and the setback value to determine whether increasing or decreasing the effective capacity requires an additional adjustment to the control set point temperature that exceeds the setback value; and
    generating, as an output in response to a determination that increasing or decreasing the effective capacity requires an additional adjustment to the control set point temperature that exceeds the setback value, a recommendation for the consumer to adjust the set point temperature.

12. The method of claim 11, further comprising at least one of using a display to visually communicates the recommendation to the consumer and using a speaker to audibly communicates the recommendation to the consumer.

13. The method of claim 11, wherein using the historical usage data to determine whether the water heater (i) has excess effective capacity or (ii) needs additional effective capacity includes determining a frequency that the upper heating element is toggled into the ON state.

14. The method of claim 11, further comprising operating according to a plurality of energy savings levels including the selected energy savings level, and wherein the plurality of energy savings levels includes a first energy savings level that prevents adjusting the set point temperature and a second energy savings level that allows adjusting the set point temperature by the setback value.

15. The method of claim 14, wherein the plurality of energy savings levels includes a third energy savings level that allows adjusting the set point temperature by the setback value and by a maximum setback value.

* * * * *